United States Patent
Xiao et al.

(10) Patent No.: US 12,505,092 B2
(45) Date of Patent: Dec. 23, 2025

(54) DATA QUERY METHOD AND APPARATUS BASED ON LARGE MODEL, ELECTRONIC DEVICE, AND STORAGE MEDIUM

(71) Applicant: BEIJING BAIDU NETCOM SCIENCE TECHNOLOGY CO., LTD., Beijing (CN)

(72) Inventors: Yixiong Xiao, Beijing (CN); Jingbo Zhou, Beijing (CN)

(73) Assignee: BEIJING BAIDU NETCOM SCIENCE TECHNOLOGY CO., LTD., Beijing (CN)

( * ) Notice: Subject to any disclaimer, the term of this patent is extended or adjusted under 35 U.S.C. 154(b) by 0 days.

(21) Appl. No.: 18/974,155

(22) Filed: Dec. 9, 2024

(65) Prior Publication Data
US 2025/0103589 A1 Mar. 27, 2025

(30) Foreign Application Priority Data
Sep. 18, 2024 (CN) .......................... 202411303160.3

(51) Int. Cl.
*G06F 16/242* (2019.01)
(52) U.S. Cl.
CPC ................. *G06F 16/2425* (2019.01)
(58) Field of Classification Search
CPC ................................................ G06F 16/24525
USPC .......................................................... 707/765
See application file for complete search history.

(56) References Cited

U.S. PATENT DOCUMENTS

2025/0077555 A1 * 3/2025 Birru ...................... G06F 16/338

FOREIGN PATENT DOCUMENTS

| CN | 116910202 A | 10/2023 |
| CN | 117271791 A | 12/2023 |

OTHER PUBLICATIONS

First Office Aaction for CN202411303160.3, issued on Aug. 11, 2025, 6 pgs.

\* cited by examiner

*Primary Examiner* — Baoquoc N To
(74) *Attorney, Agent, or Firm* — Kwan & Olynick LLP

(57) ABSTRACT

Data query method and apparatus based on large model, an electronic device, and a storage medium are disclosed, which relates to the field of artificial intelligence, specifically in natural language processing, deep learning, and large model technologies, applicable to scenarios such as dialogue systems and information retrieval. The method includes: performing entity recognition on a query to obtain the target entity in the query; obtaining a first related content associated with the target entity from internal information, and performing data analysis on the first related content using a large language model (LLM) to obtain a data analysis result; obtaining a second related content associated with the target entity from external information, and performing data generation on the second related content using the LLM to obtain a data generation result; obtaining a query result corresponding to the query based on the data analysis result and the data generation result.

15 Claims, 5 Drawing Sheets

DATA QUERY METHOD AND APPARATUS BASED ON LARGE MODEL, ELECTRONIC DEVICE, AND STORAGE MEDIUM

The present application claims the priority of Chinese Patent Application No. 202411303160.3, filed on Sep. 18, 2024, with the title of "Data Query Method and Apparatus based on Large Model, Electronic Device, and Storage Medium". The disclosure of the above application is incorporated herein by reference in its entirety.

FIELD OF THE DISCLOSURE

The present disclosure relates to the field of artificial intelligence, specifically in natural language processing, deep learning, and large model technologies, applicable to scenarios such as dialogue systems and information retrieval. More particularly, the present disclosure relates to data query method and apparatus based on large model, an electronic device, and a storage medium.

BACKGROUND OF THE DISCLOSURE

With the rapid development of Large Language Model (LLM, referred to as large model hereinafter) in the field of natural language processing, they have demonstrated exceptional capabilities in complex dialogue, reasoning, and content generation.

SUMMARY OF THE DISCLOSURE

The present disclosure provides data query method and apparatus based on large model, an electronic device, and a storage medium.

According to one aspect of the present disclosure, a method for data query based on large model is provided, which includes: performing entity recognition on a query to obtain a target entity in the query; obtaining a first related content associated with the target entity from internal information, and performing data analysis on the first related content using a large language model (LLM) to obtain a data analysis result; obtaining a second related content associated with the target entity from external information, and performing data generation on the second related content using the LLM to obtain a data generation result; and obtaining a query result corresponding to the query based on the data analysis result and the data generation result.

According to another aspect of the present disclosure, there is provided an electronic device, including: at least one processor; and a memory communicatively connected with the at least one processor; wherein the memory stores instructions executable by the at least one processor, and the instructions are executed by the at least one processor to enable the at least one processor to perform a method for data query based on large model, wherein the method for data query based on large model includes: performing entity recognition on a query to obtain the target entity in the query; obtaining a first related content associated with the target entity from internal information, and performing data analysis on the first related content using a large language model (LLM) to obtain a data analysis result; obtaining a second related content associated with the target entity from external information, and performing data generation on the second related content using the LLM to obtain a data generation result; obtaining a query result corresponding to the query based on the data analysis result and the data generation result.

According to another aspect of the present disclosure, there is provided a non-transitory computer readable storage medium with computer instructions stored thereon, wherein the computer instructions are used for causing a method for data query based on large model, wherein the method for data query based on large model includes: performing entity recognition on a query to obtain a target entity in the query; obtaining a first related content associated with the target entity from internal information, and performing data analysis on the first related content using a large language model (LLM) to obtain a data analysis result; obtaining a second related content associated with the target entity from external information, and performing data generation on the second related content using the LLM to obtain a data generation result; and obtaining a query result corresponding to the query based on the data analysis result and the data generation result.

It should be understood that the content described in this section is not intended to identify key or essential features of the embodiments of the present disclosure, nor is it intended to limit the scope of the present disclosure. Other features of the present disclosure will become apparent from the following description.

BRIEF DESCRIPTION OF DRAWINGS

The drawings are used for better understanding the present solution and do not constitute a limitation of the present disclosure. In the drawings.

DETAILED DESCRIPTION OF PREFERRED EMBODIMENTS

The following description is provided in conjunction with the drawings to illustrate exemplary embodiments of the present disclosure, including various details of the embodiments to aid understanding. It should be understood that these embodiments are merely exemplary and that those of ordinary skill in the art should recognize that various changes and modifications can be made to the described embodiments without departing from the scope and spirit of the present disclosure. Similarly, for clarity and brevity, the description omits the description of well-known functions and structures.

Although LLMs excel in certain aspects, existing LLM techniques often fail to provide comprehensive and accurate answers when dealing with complex tasks involving data analysis and information retrieval.

In order to improve the accuracy of query results, the present disclosure provides the following embodiments.

Figure 1:
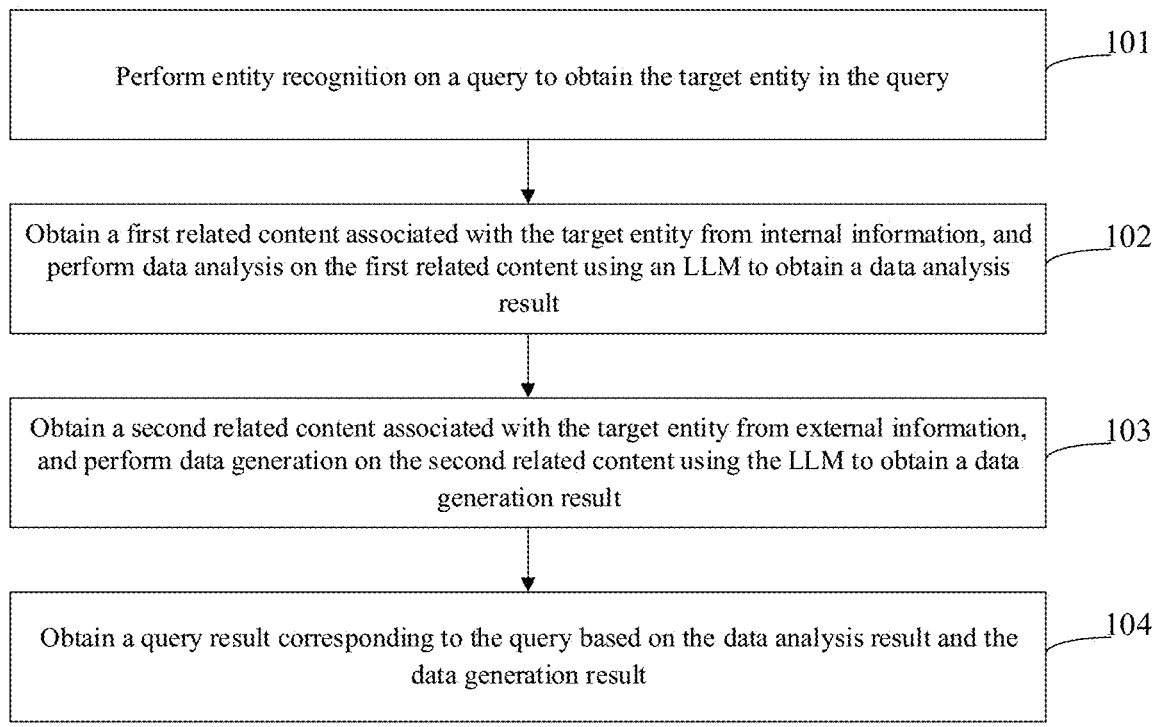
FIG. 1 is a schematic diagram according to the first embodiment of the present disclosure.

FIG. 1 is a schematic diagram according to the first embodiment of the present disclosure. This embodiment provides a method for data query based on large model, which includes:

101. Performing entity recognition on a query to obtain the target entity in the query.

102. Obtaining a first related content associated with the target entity from internal information, and performing data analysis on the first related content using an LLM to obtain a data analysis result.

103. Obtaining a second related content associated with the target entity from external information, and performing data generation on the second related content using the LLM to obtain a data generation result.

104. Obtaining a query result corresponding to the query based on the data analysis result and the data generation result.

The query is the content to be queried. Specifically, a user can input a query in natural language.

The target entity refers to the entity obtained after performing entity recognition on the query, and the target entity can be one or more.

The target entity can include one or more of geographic information, time information, domain information, etc. For example, if the query is "Why did City X's GDP grow in the first quarter of 2023?", after performing entity recognition on this query, the following target entities can be obtained:

Geographic information: City X

Time information: Q1 2023

Domain information: Gross Domestic Product (GDP)

In order to improve the comprehensiveness and accuracy of query results, the present embodiment combines internal information and external information to obtain query results.

Internal information refers to the user's private information, such as the user's local database, which can store structured data such as data tables. Generally, internal information is not publicly available and cannot be obtained through search engines.

External information refers to publicly available information such as news and forums, which can be obtained through search engines.

The content associated with the target entity obtained from internal information is called a first related content, and the content associated with the target entity obtained from external information is called a second related content.

After obtaining the first related content, the LLM can be used to perform data analysis on the first related content to obtain a data analysis result.

Data analysis refers to using the LLM to understand and gain insights from the data, identify trends in the data, etc., and perform summarization based on the trends in the data to obtain a data analysis result.

For example, in the field of socio-economics, based on the above query example, an impact factor (IF) related to domain information (such as GDP) can be obtained, where IFs may include revenue (such as information revenue, software revenue, etc.), and the trend curves of these IFs over time can be analyzed, such as the trend curve of revenue growth or decline within the geographical location and time period mentioned above (such as City X in Q1 of 2023). After obtaining these trend curves, these trend curves can be summarized to obtain summary results of the text, which serves as the data analysis result.

After obtaining the second related content, the LLM can be used to perform data generation on the second related content to obtain a data generation result.

Data generation refers to using the LLM to generate new data based on the retrieved data, with the newly generated data serving as the data generation result.

In this embodiment, the second related content is obtained from external information, and the LLM performs data generation based on the second related content. Since this generation process references external information rather than relying solely on the LLM's own generation capabilities, the data generation in this embodiment can be referred to as Retrieval-Augmented Generation (RAG), which combines language models with information retrieval techniques to improve the accuracy of the data generation result.

After obtaining the data analysis result and the data generation result, the final query result can be obtained based on these two results. For example, the data analysis result and the data generation result can be concatenated together as the query result.

In this embodiment, by obtaining the first related content from internal information and the second related content from external information, data queries can be conducted by combining internal and external information to improve comprehensiveness. By performing data analysis on the first related content and data generation on the second related content and obtaining the query result based on the data analysis result and the data generation result, multiple methods can be used to obtain the query result, further enhancing comprehensiveness. By using the LLM for data analysis and data generation, the powerful data analysis and data generation capabilities of the LLM can be leveraged to improve accuracy. Therefore, the comprehensiveness and accuracy of data queries can be enhanced.

To better understand the embodiments of the present disclosure, an application scenario where the embodiments can be applied is described.

Figure 2:
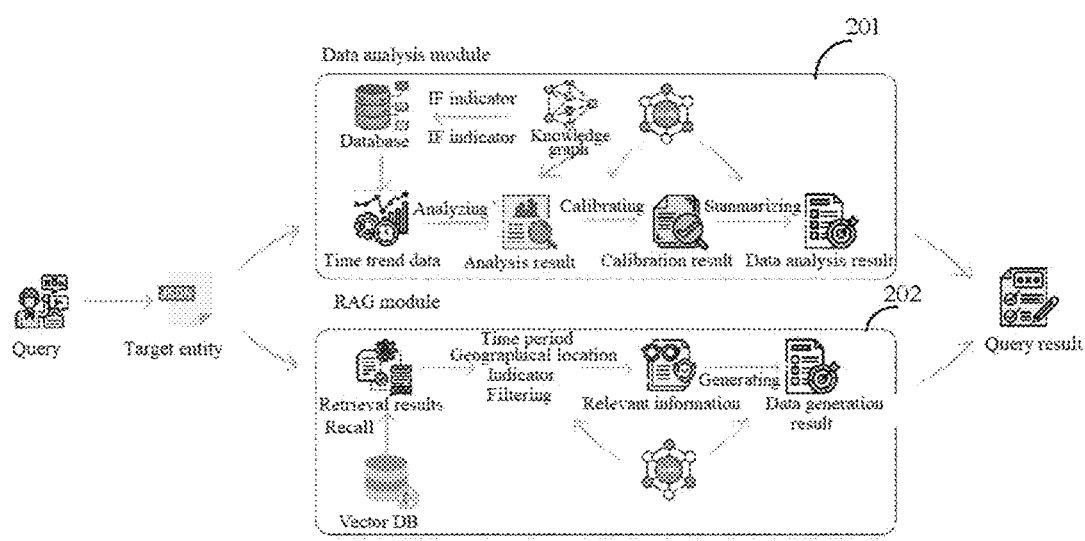
FIG. 2 is a schematic diagram of an application scenario for implementing the embodiments of the present disclosure.

FIG. 2 is a schematic diagram of an application scenario for implementing the embodiments of the present disclosure.

In this scenario, a user can input a query to a data query system through an application (APP) installed on a user terminal. The query, for example, is: "Why did City X's GDP grow in the first quarter of 2023?"

Upon receiving the query, the data query system performs entity recognition to obtain the target entities in the query.

The data query system can use preset entity recognition rules for entity recognition, or it can call the LLM to perform entity recognition on the query using the LLM. Taking entity recognition based on the LLM as an example, the data query system can input the query and the prompt into the LLM. The prompt can be preset, such as "Identify the entities in it". The LLM performs entity recognition on the query based on this prompt, obtains the target entities in the query and feeds them back to the data query system.

Based on the above query example, the target entities may include:

Domain information: GDP

Time information: Q1 2023

Geographic information: City X

As shown in FIG. 2, the query part of the data query system includes a data analysis module 201 and a retrieval-augmented generation (RAG) module 202.

The data analysis module primarily obtains the first related content associated with the target entity from internal information, performs data analysis on the first related content using the LLM, and obtains a data analysis result.

The RAG module primarily obtains the second related content associated with the target entity from external information, performs data generation on the second related content using the LLM, and obtains a data generation result.

The internal information, for example, is a local database set by the user, which can store data tables. The first related content can be obtained by querying the data tables.

After obtaining the first related content, the LLM can be used to analyze, calibrate, and summarize the first related content to obtain a data analysis result.

The external information, for example, is obtained by calling a search engine, which retrieves the second related content from external information such as news and forums.

After obtaining the second related content, the LLM can be used to filter and generate the second related content to obtain a data generation result.

After obtaining the data analysis result and the data generation result, these two results can be concatenated to obtain the query result, which includes two parts: the data analysis result and the data generation result.

Figure 3:
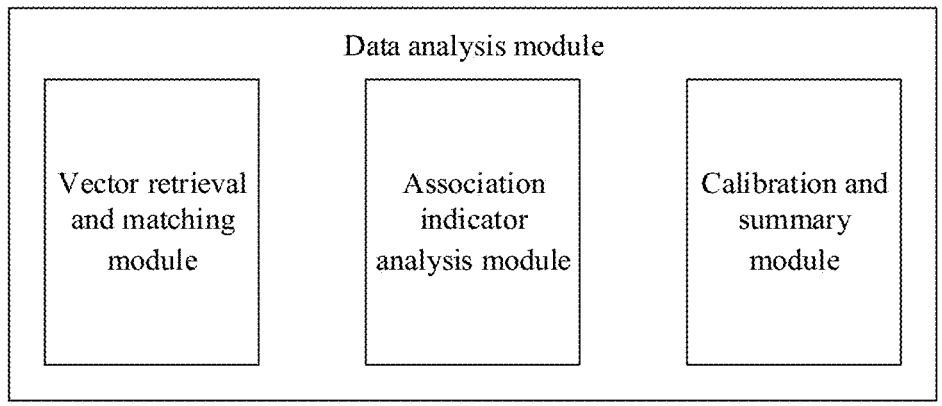
FIG. 3 is a schematic diagram of the data analysis module provided by the embodiments of the present disclosure.

FIG. 3 is a schematic diagram of the data analysis module provided by the embodiments of the present disclosure.

As shown in FIG. 3, the data analysis module includes: vector retrieval and matching module, association indicator analysis module, and calibration and summary module.

Vector retrieval and matching module: Primarily converts the target entity into an entity vector and matches it with the field vectors in the database to determine the target field.

In this way, it can ensure that the entities in the user query can be correctly mapped to the corresponding fields in the database. The system uses vector search technology to identify the database column names that are most similar to the query entities. For example, "GDP" in the user query might be labeled as "Gross Domestic Product" in the database, and vector search technology can match the correct field.

Association indicator analysis module: Primarily obtains IFs related to the target field based on a knowledge graph and analyzes the trends of these IFs within the specified time and location, such as the time and location included in the query.

For example, knowledge graphs can be used to obtain IFs related to "GDP", including information revenue, software revenue, etc. Time trend data for these revenues within the specified time and location can be obtained in the database. Then, the LLM can be used to analyze these revenues to obtain an analysis result. For example, the LLM calculates the values of these revenues separately and then obtains the GDP value based on the relationship between these revenues and GDP.

Calibration and summary module: Primarily calibrates the analysis result to obtain a calibration result and summarizes the calibration result to obtain a data analysis result.

For example, the query input by a user may not be accurate. In an example, the above query indicates that GDP is growing, but the correct result may actually be a decrease. Therefore, during calibration, the main task is to determine whether GDP is growing. If an accurate GDP value can be obtained after analysis, this value can be used to determine whether GDP is growing. If the query is incorrect, it can be calibrated, such as the calibration result being "City X's GDP in the first quarter of 2023 decreased."

After obtaining the calibration result, the calibration result and the analysis result are summarized to obtain the data analysis result. For example, the data analysis result might be "City X's GDP value in the first quarter of 2023 was Y yuan, derived from information revenue and software revenue." Alternatively, if the correct result for GDP is a decrease, the data analysis result might be "City X's GDP value in the first quarter of 2023 was Y yuan, which is a decrease". This can promptly correct the user query error and improve the accuracy of the query result.

Figure 4:
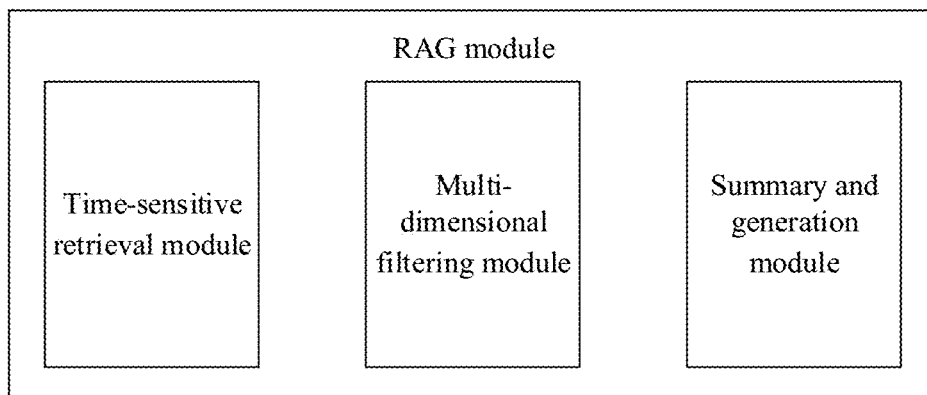
FIG. 4 is a schematic diagram of the RAG module provided by the embodiments of the present disclosure.

FIG. 4 is a schematic diagram of the RAG module provided by the embodiments of the present disclosure.

As shown in FIG. 4, the RAG module includes: time-sensitive retrieval module, multi-dimensional filtering module, and generation module.

Time-sensitive retrieval module: Typically, retrieval is based on the similarity between candidate documents and the target entity. In this embodiment, to improve timeliness, the retrieval module primarily obtains candidate documents whose publication time matches the time information in the target entity.

Specifically, the target entity is converted into an entity vector and matched with pre-processed document fragments. Documents published within the relevant time period (such as the first quarter of 2023) are prioritized for retrieval, thereby ensuring the timeliness and relevance of the retrieval results.

Multi-dimensional filtering module: the retrieval results are filtered in multiple dimensions based on LLM, including relevance to the query indicators, time matching, geographic matching, etc. Only content that meets all criteria is retained and proceeds to the next step of summary generation.

Summary and generation module: the LLM is used to summarize and generate based on the filtering results. Additionally, during data generation, the information source corresponding to the filtering results (such as document titles, URLs, etc.) is referenced to improve the credibility of the generated content. For example, content from authoritative websites is prioritized.

The data generation result might be "Some views believe that City X's GDP growth in the first quarter of 2023 was mainly due to . . . "

After obtaining the data analysis result and the data generation result, these two results can be concatenated to obtain the query result. For example, the query result might be "City X's GDP value in the first quarter of 2023 was Y yuan, derived from information revenue and software revenue; some views believe that City X's GDP growth in the first quarter of 2023 was mainly due to . . . "

Based on the above application scenario, the present disclosure also provides the following embodiments.

Figure 5:
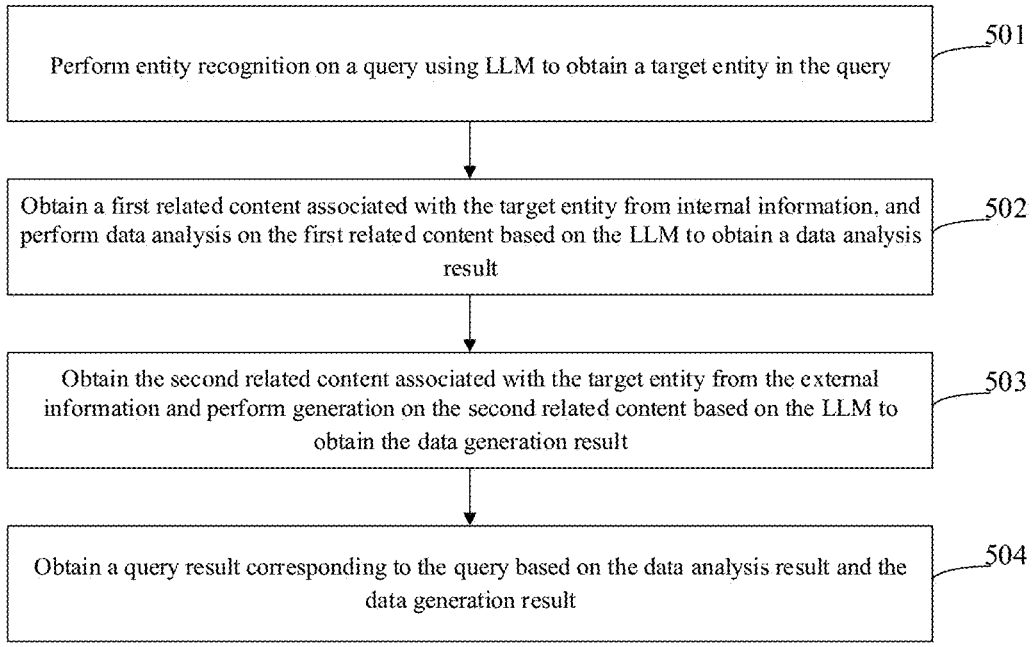
FIG. 5 is a schematic diagram according to the second embodiment of the present disclosure.

FIG. 5 is a schematic diagram according to the second embodiment of the present disclosure. This embodiment provides a method for data query based on large model, which includes:

501. Performing entity recognition on a query using LLM to obtain a target entity in the query:

For example, the data query system can input the query and prompt into the LLM. The prompt can be preset, such as "Identify entities within." The LLM performs entity recognition on the query based on this prompt, obtains a target entity in the query and feeds it back to the data query system.

In this embodiment, the target entity in the query is obtained based on the LLM, which can leverage the excellent performance of the LLM to improve the accuracy of the target entity, thereby enhancing the accuracy of data queries.

502. Obtaining a first related content associated with the target entity from internal information, and performing data analysis on the first related content based on the LLM to obtain a data analysis result.

For the first related content:
Converting the target entity into an entity vector.
Obtaining a target content that matches the entity vector from the internal information.
Obtaining a relevant content of the target content based on a preset knowledge graph.
Using the target content and the relevant content as the first related content.

For example, if the internal information is a local database, the query can be converted into a query instruction, such as a Structured Query Language (SQL) instruction. Specifically, the query can be converted into a query instruction based on preset rules or the LLM. The query instruction contains the entity vector corresponding to the target entity. By querying the local database with this instruction, the target field (such as Gross Domestic Product) matching the target entity (such as GDP) can be obtained, and then this target field and its field value (such as the specific GDP value) can be used as the target content.

After obtaining the target content, the relevant content of the target content can be obtained based on the knowledge graph. For example, the knowledge graph indicates that GDP is related to information revenue and software revenue, then information revenue and software revenue can be used as the relevant content. Alternatively, the specific values of these relevant contents (such as information revenue and software revenue) can also be obtained from the local database, and these indicators (information revenue and software revenue) and their values are used as the relevant content.

In this embodiment, by converting the target entity into an entity vector and obtaining the target content based on the entity vector, the problem of inconsistency between the target entity in the query and the stored target content can be solved, improving the comprehensiveness and accuracy of the query. The comprehensiveness and accuracy of the query can be further enhanced by obtaining the related content through the knowledge graph and using the target content and the related content as the first related content.

For data analysis:
Analyzing the first related content using the LLM to obtain an analysis result.
Calibrating the query using the LLM based on the analysis result to obtain a calibration result.
Summarizing the analysis result and the calibration result using the LLM to obtain the data analysis result.

For example, the time trend data of relevant indicators can be obtained based on the values of these indicators, and an analysis result can be obtained based on these time trend data, such as the increase in information revenue leading to GDP growth. Additionally, the GDP value obtained from the local database can determine the correct result of whether GDP is growing. If this correct result is inconsistent with the query, the query is calibrated. For example, if the query indicates GDP growth but the correct result is a decrease, the calibration result explicitly indicates that GDP is decreasing. This is beneficial for error correction and improves the accuracy of data queries. After that, the LLM can be used to summarize the analysis result and the calibration result to obtain the data analysis result.

In this embodiment, by obtaining the data analysis result through analysis, calibration, and summarization, the accuracy of the data analysis result can be improved, thereby enhancing the accuracy of data queries.

503. Obtaining the second related content associated with the target entity from the external information and performing generation on the second related content based on the LLM to obtain the data generation result.

For the second related content:
Obtaining external information that matches with the time of the query based on the publication time of the external information.
Obtaining the second related content associated with the target entity from the external information that matches with the time of the query.

For example, if the query is asking about the situation in the first quarter of 2023, then in the external information, the text data published within the first quarter of 2023 is used as the external information that matches with the time of the query.

For these text data published within the first quarter of 2023, based on the similarity to the target entity, specifically the vector similarity, relevant text data is obtained as the second related content.

In this embodiment, by obtaining the second related content from external information that matches with the time of the query, the timeliness and relevance of data queries can be improved.

For data generation:
Filtering the second related content using the LLM to obtain a filtering result.
Performing generation on the data filtering result using the LLM based on an information source corresponding to the filtering result to obtain the data generation result.

The filtering can be multi-dimensional, such as filtering based on dimensions of time, geography, indicators, etc. Removing results that are inconsistent with the time, geography, indicators, etc., from the search results will result in a filtering result.

The filtering result is usually text data, and its corresponding information source can be the URL, title, etc., of the text data. During data generation, the LLM can combine the URL, title, etc., of the text data to generate the data generation result.

In this embodiment, filtering and combining the information source for data generation can improve the accuracy of the data generation result.

504. Obtaining a query result corresponding to the query based on the data analysis result and the data generation result:

For example, the query result can be obtained by concatenating the data analysis result and the data generation result.

Figure 6:
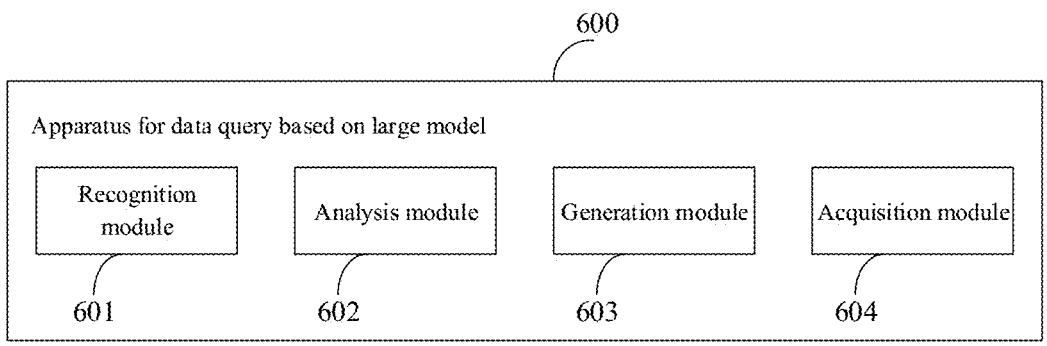
FIG. 6 is a schematic diagram according to the third embodiment of the present disclosure.

FIG. 6 is a schematic diagram according to the third embodiment of the present disclosure. This embodiment provides an apparatus for data query based on large model. As shown in FIG. 6, the apparatus 600 includes: a recognition module 601, an analysis module 602, a generation module 603, and an acquisition module 604.

The recognition module 601 is used to perform entity recognition on a query to obtain a target entity in the query. The analysis module 602 is used to obtain a first related content associated with the target entity from internal information, perform data analysis on the first related content using a large language model (LLM) to obtain a data analysis result. The generation module 603 is used to obtain a second related content associated with the target entity from external information, perform data generation on the second related content using the LLM to obtain a data generation result. The acquisition module 604 is used to obtain the query result corresponding to the query based on the data analysis result and the data generation result.

In this embodiment, by obtaining the first related content from internal information and the second related content from external information, data queries can be conducted by combining internal and external information to improve comprehensiveness. By performing data analysis on the first related content and data generation on the second related content and obtaining the query result based on the data analysis result and the data generation result, multiple methods can be used to obtain the query result, further enhancing comprehensiveness. By using the LLM for data analysis and data generation, the powerful data analysis and data generation capabilities of the LLM can be leveraged to improve accuracy. Therefore, the comprehensiveness and accuracy of data queries can be enhanced.

In some embodiments, the analysis module 602 is further used to:
convert the target entity into an entity vector;
obtain a target content that matches the entity vector from the internal information;
obtain a relevant content of the target content based on a preset knowledge graph.
use the target content and the relevant content as the first related content.

In this embodiment, by converting the target entity into an entity vector and obtaining the target content based on the entity vector, the problem of inconsistency between the target entity in the query and the stored target content can be solved, improving the comprehensiveness and accuracy of the query. The comprehensiveness and accuracy of the query can be further enhanced by obtaining the related content through the knowledge graph and using the target content and the related content as the first related content.

In some embodiments, the analysis module 602 is further used to:
analyze the first related content using the LLM to obtain an analysis result;
calibrate the query using the LLM based on the analysis result to obtain a calibration result;
summarize the analysis result and the calibration result using the LLM to obtain the data analysis result.

In this embodiment, by obtaining the data analysis result through analysis, calibration, and summarization can improve the accuracy of the data analysis result can be improved, thereby enhancing the accuracy of data queries.

In some embodiments, the generation module 603 is further used to:
obtain the external information that matches with the time of the query based on the publication time of the external information.
obtain the second related content associated with the target entity from the external information that matches with the time of the query.

In this embodiment, by obtaining the second related content from external information that matches with the time of the query, the timeliness and relevance of data queries can be improved.

In some embodiments, the generation module 603 is further used to:
filter the second related content using the LLM to obtain a filtering result;
perform generation on the data filtering result using the LLM based on an information source corresponding to the filtering result to obtain the data generation result.

In this embodiment, filtering and combining the information source for data generation can improve the accuracy of the data generation result.

In some embodiments, the recognition module 601 is further used to:
perform entity recognition on the query based on the LLM to obtain the target entity.

In this embodiment, the target entity in the query is obtained based on the LLM, which can leverage the excellent performance of the LLM to improve the accuracy of the target entity, thereby enhancing the accuracy of data queries.

It should be understood that in the embodiments of the present disclosure, the same or similar content in different embodiments can be mutually referenced.

It should be understood that terms such as "first" and "second" in the embodiments of the present disclosure are only used for differentiation and do not indicate importance or sequence.

It should be understood that the order of steps in the process, unless otherwise specified, indicates that the temporal relationship between these steps is not limited.

The technical solutions of the present disclosure, in terms of the collection, storage, use, processing, transmission, provision, and disclosure of user personal information, comply with relevant laws and regulations and do not violate public order and good customs.

According to the embodiments of the present disclosure, the present disclosure also provides an electronic device, a readable storage medium, and a computer program product.

Figure 7:
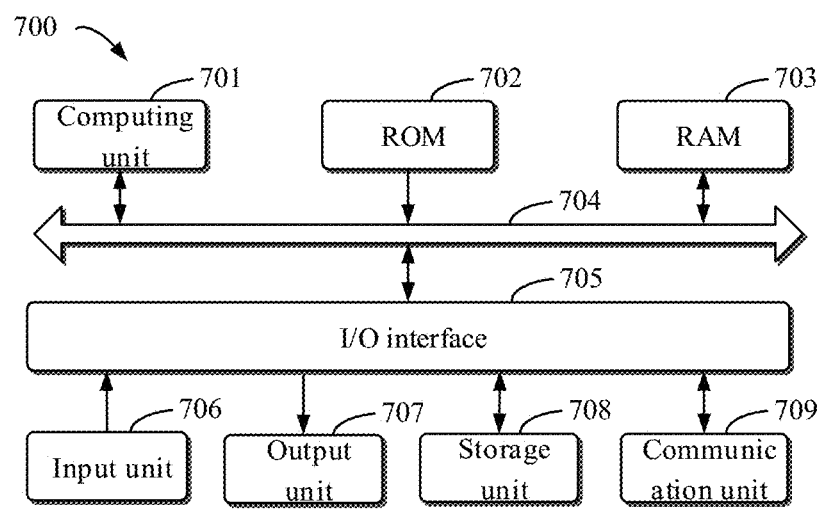
FIG. 7 is a schematic diagram of an electronic device for implementing the data query method based on a large model according to the embodiments of the present disclosure.

FIG. 7 shows a schematic block diagram of an example electronic device 700 that can be used to implement the embodiments of the present disclosure. The electronic device 700 is intended to represent various forms of digital computers, such as laptop computers, desktop computers, workstations, servers, blade servers, mainframe computers, and other suitable computers. The electronic device can also represent various forms of mobile devices, such as personal digital assistants, cellular phones, smartphones, wearable devices, and other similar computing devices. The components shown in this article, their connections and relationships, and their functions are merely examples and are not intended to limit the implementations of the present disclosure as described and/or claimed in this article.

As shown in FIG. 7, the electronic device 700 includes a computing unit 701, which can perform various appropriate actions and processes according to a computer program stored in a Read-Only Memory (ROM) 702 or a computer program loaded from a storage unit 708 into a Random Access Memory (RAM) 703. Various programs and data necessary for the operation of the electronic device 700 are also stored in the RAM 703. The computing unit 701, ROM 702, and RAM 703 are connected to each other via a bus 704. An Input/Output (I/O) interface 705 is also connected to the bus 704.

Multiple components of the electronic device 700 are connected to the I/O interface 705, including: an input unit 706, such as a keyboard, mouse, etc.; an output unit 707, such as various types of displays, speakers, etc.; a storage unit 708, such as disks, optical disks, etc.; and a communication unit 709, such as a network card, modem, wireless communication transceiver, etc. The communication unit 709 allows the electronic device 700 to exchange information/data with other devices via computer networks such as the Internet and/or various telecommunications networks.

The computing unit 701 can be various general-purpose and/or special-purpose processing components with processing and computing capabilities. Examples of the computing unit 701 include, but are not limited to, a Central Processing Unit (CPU), Graphics Processing Unit (GPU), various special-purpose Artificial Intelligence (AI) computing chips, various computing units running machine learning model algorithms, Digital Signal Processor (DSP), and any appropriate processor, controller, microcontroller, etc. The computing unit 701 executes the various methods and processes described above, such as the method for data query based on large model. For example, in some embodiments, the method for data query based on large model can be implemented as a computer software program, which is tangibly contained in a machine-readable medium, such as the storage unit 708. In some embodiments, portions or all of the computer program can be loaded and/or installed onto the electronic device 700 via the ROM 702 and/or the communication unit 709. When the computer program is loaded into the RAM 703 and executed by the computing unit 701, one or more steps of the method for data query based on large model described above can be executed. Alternatively, in other embodiments, the computing unit 701 can be configured to execute the method for data query based on large model by any other suitable means, such as via firmware.

The various embodiments of the systems and technologies described above can be implemented in digital electronic circuitry, integrated circuits, Field-Programmable Gate Arrays (FPGAs), Application-Specific Integrated Circuits (ASICs), Application-Specific Standard Products (ASSPs), System-on-a-Chip (SoC), Complex Programmable Logic Devices (CPLDs), computer hardware, firmware, software, and/or combinations thereof. These various embodiments may include: implementation in one or more computer programs, which can be executed and/or interpreted on a programmable system including at least one programmable processor, which may be a special-purpose or general-purpose programmable processor, receiving data and instructions from a storage system, at least one input device, and at least one output device, and transmitting data and instructions to the storage system, the at least one input device, and the at least one output device.

Program code for implementing the methods of the present disclosure can be written in any combination of one or more programming languages. This program code can be provided to a processor or controller of a general-purpose computer, special-purpose computer, or other programmable data processing apparatus to produce a machine, such that the program code, when executed by the processor or controller, causes the functions/operations specified in the flowcharts and/or block diagrams to be implemented. The program code may be entirely executed on the machine, partially executed on the machine, as a standalone software package, partially executed on the machine and partially executed on a remote machine, or entirely executed on the remote machine or server.

In the context of the present disclosure, a machine-readable medium may be a tangible medium that can contain or store a program for use by or in connection with an instruction execution system, apparatus, or device. The machine-readable medium may be a machine-readable signal medium or a machine-readable storage medium. The machine-readable medium may include, but is not limited to, an electronic, magnetic, optical, electromagnetic, infrared, or semiconductor system, apparatus, or device, or any suitable combination of the foregoing. More specific examples of the machine-readable storage medium would include an electrical connection based on one or more wires, a portable computer diskette, a hard disk, a Random Access Memory (RAM), a Read-Only Memory (ROM), an Erasable Programmable Read-Only Memory (EPROM or Flash memory), an optical fiber, a portable compact disc read-only memory (CD-ROM), an optical storage device, a magnetic storage device, or any suitable combination of the foregoing.

To provide interaction with a user, the systems and technologies described here can be implemented on a computer having a display device (e.g., a CRT (cathode ray tube) or LCD (liquid crystal display) monitor) for displaying information to the user; a keyboard; and a pointing device (e.g., a mouse or a trackball) by which the user can provide input to the computer. Other kinds of devices can also be used to provide interaction with a user; for example, feedback provided to the user can be any form of sensory feedback (e.g., visual feedback, auditory feedback, or tactile feedback); and input from the user can be received in any form, including acoustic, speech, or tactile input.

The systems and technologies described here can be implemented in a computing system that includes a back-end component (e.g., as a data server), or that includes a middleware component (e.g., an application server), or that includes a front-end component (e.g., a user computer with a graphical user interface or a Web browser through which a user can interact with an implementation of the systems and technologies described here), or any combination of such back-end, middleware, or front-end components. The components of the system can be interconnected by any form or medium of digital data communication (e.g., a communication network). Examples of communication networks include a Local Area Network (LAN), a Wide Area Network (WAN), and the Internet.

The computing system can include clients and servers. A client and server are generally remote from each other and typically interact through a communication network. The relationship of client and server arises by virtue of computer programs running on the respective computers and having a client-server relationship to each other. A server can be a cloud server, also known as a cloud computing server or cloud host, which is a host product in the cloud computing service system, addressing the shortcomings of traditional physical hosts and VPS services ("Virtual Private Server," or "VPS") in terms of difficult management and weak business scalability. The server can also be a server in a distributed system or a server that incorporates blockchain technology.

It should be understood that various forms of processes shown above can be reordered, added, or deleted. For example, the steps described in the present disclosure can be executed in parallel, sequentially, or in different orders, as long as the desired results of the technical solutions disclosed in the present disclosure are achieved. This is not limited herein.

The specific embodiments described above do not constitute a limitation on the scope of protection of the present disclosure. Those skilled in the art should understand that various modifications, combinations, sub-combinations, and substitutions can be made according to design requirements and other factors. Any modifications, equivalent substitutions, and improvements made within the spirit and principle of the present disclosure shall be included within the scope of protection of the present disclosure.

What is claimed is:

1. A computer-implemented method for data query based on large model, comprising:
    performing entity recognition on a query input by a user in natural language to obtain a target entity in the query, where the target entity comprises one or more of geographic information, time information, and domain information;
    converting the target entity into an entity vector; obtaining a target content that matches the entity vector in a database from internal information so that the target entity in the query is correctly mapped to the corresponding field in the database; obtaining impact factors related to the domain information of the target entity based on a knowledge graph and analyzing the trends of the impact factors related to the geographic information and the time information of the target entity to obtain a relevant content of the target content; using the target content and the relevant content as first related content, and performing data analysis on the first related content using a large language model (LLM) to obtain a data analysis result;

obtaining a second related content associated with the target entity from external information, and performing data generation on the second related content using the LLM to obtain a data generation result; and obtaining a query result corresponding to the query based on the data analysis result and the data generation result.

2. The method of claim 1, wherein performing data analysis on the first related content using the LLM to obtain the data analysis result comprises:

analyzing the first related content using the LLM to obtain an analysis result;

calibrating the query using the LLM based on the analysis result to obtain a calibration result; and summarizing the analysis result and the calibration result using the LLM to obtain the data analysis result.

3. The method of claim 1, wherein obtaining the second related content associated with the target entity from the external information comprises:

obtaining external information that matches with the time of the query based on a publication time of the external information; and obtaining the second related content associated with the target entity from the external information that matches with the time of the query.

4. The method of claim 1, wherein performing data generation on the second related content using the LLM to obtain the data generation result comprises:

filtering the second related content using the LLM to obtain a filtering result; and performing generation on the data filtering result using the LLM based on an information source corresponding to the filtering result to obtain the data generation result.

5. The method of claim 1, wherein performing entity recognition on the query to obtain the target entity in the query comprises:

performing entity recognition on the query based on the LLM to obtain the target entity.

6. An electronic device, comprising:

at least one processor; and a memory communicatively connected with the at least one processor;

wherein the memory stores instructions executable by the at least one processor, and the instructions are executed by the at least one processor to enable the at least one processor to perform a method for data query based on large model, wherein the method for data query based on large model comprises:

performing entity recognition on a query input by a user in natural language to obtain a target entity in the query, where the target entity comprises one or more of geographic information, time information, and domain information;

converting the target entity into an entity vector; obtaining a target content that matches the entity vector in a database from internal information so that the target entity in the query is correctly mapped to the corresponding field in the database; obtaining impact factors related to the domain information of the target entity based on a knowledge graph and analyzing the trends of the impact factors related to the geographic information and the time information of the target entity to obtain a relevant content of the target content; using the target content and the relevant content as first related content, and performing data analysis on the first related content using a large language model (LLM) to obtain a data analysis result;

obtaining a second related content associated with the target entity from external information, and performing data generation on the second related content using the LLM to obtain a data generation result; and obtaining a query result corresponding to the query based on the data analysis result and the data generation result.

7. The electronic device of claim 6, wherein performing data analysis on the first related content using the LLM to obtain the data analysis result comprises:

analyzing the first related content using the LLM to obtain an analysis result;

calibrating the query using the LLM based on the analysis result to obtain a calibration result; and summarizing the analysis result and the calibration result using the LLM to obtain the data analysis result.

8. The electronic device of claim 6, wherein obtaining the second related content associated with the target entity from the external information comprises:

obtaining external information that matches with the time of the query based on a publication time of the external information; and obtaining the second related content associated with the target entity from the external information that matches with the time of the query.

9. The electronic device of claim 6, wherein performing data generation on the second related content using the LLM to obtain the data generation result comprises:

filtering the second related content using the LLM to obtain a filtering result; and performing generation on the data filtering result using the LLM based on an information source corresponding to the filtering result to obtain the data generation result.

10. The electronic device of claim 6, wherein performing entity recognition on the query to obtain the target entity in the query comprises:

performing entity recognition on the query based on the LLM to obtain the target entity.

11. A non-transitory computer readable storage medium with computer instructions stored thereon, wherein the computer instructions are used for causing a method for data query based on large model, wherein the method for data query based on large model comprises:

performing entity recognition on a query input by a user in natural language to obtain a target entity in the query, where the target entity comprises one or more of geographic information, time information, and domain information;

converting the target entity into an entity vector; obtaining a target content that matches the entity vector in a database from internal information so that the target entity in the query is correctly mapped to the corresponding field in the database; obtaining impact factors related to the domain information of the target entity based on a knowledge graph and analyzing the trends of the impact factors related to the geographic information and the time information of the target entity to obtain a relevant content of the target content; using the target content and the relevant content as first related content, and performing data analysis on the first related content using a large language model (LLM) to obtain a data analysis result;

obtaining a second related content associated with the target entity from external information, and performing data generation on the second related content using the LLM to obtain a data generation result; and obtaining a query result corresponding to the query based on the data analysis result and the data generation result.

12. The non-transitory computer readable storage medium of claim 11, wherein performing data analysis on the first related content using the LLM to obtain the data analysis result comprises:

analyzing the first related content using the LLM to obtain an analysis result;

calibrating the query using the LLM based on the analysis result to obtain a calibration result; and summarizing the analysis result and the calibration result using the LLM to obtain the data analysis result.

13. The non-transitory computer readable storage medium of claim 11, wherein obtaining the second related content associated with the target entity from the external information comprises:

obtaining external information that matches with the time of the query based on a publication time of the external information; and obtaining the second related content associated with the target entity from the external information that matches with the time of the query.

14. The non-transitory computer readable storage medium of claim 11, wherein performing data generation on the second related content using the LLM to obtain the data generation result comprises:

filtering the second related content using the LLM to obtain a filtering result; and performing generation on the data filtering result using the LLM based on an information source corresponding to the filtering result to obtain the data generation result.

15. The non-transitory computer readable storage medium of claim 11, wherein performing entity recognition on the query to obtain the target entity in the query comprises:

performing entity recognition on the query based on the LLM to obtain the target entity.

* * * * *